United States Patent [19]

Schroeder

[11] 4,398,862
[45] Aug. 16, 1983

[54] PIVOT PIN ASSEMBLY

[75] Inventor: William L. Schroeder, Buffalo Grove, Ill.

[73] Assignee: Dresser Industries, Inc., Dallas, Tex.

[21] Appl. No.: 351,046

[22] Filed: Feb. 22, 1982

[51] Int. Cl.³ .............................................. F16C 11/02
[52] U.S. Cl. ..................................... 414/723; 384/249; 403/14; 403/154; 403/162
[58] Field of Search .................. 403/13, 14, 154, 162, 403/163; 384/249, 258; 411/393; 414/723, 694, 686

[56] References Cited

U.S. PATENT DOCUMENTS

| | | | |
|---|---|---|---|
| 3,841,771 | 10/1974 | Shankwitz et al. | 403/163 |
| 3,997,274 | 12/1976 | Iverson | 403/10 |
| 4,022,536 | 5/1977 | Piepho et al. | 403/154 X |
| 4,096,957 | 6/1978 | Iverson et al. | 214/145 R |
| 4,251,182 | 2/1981 | Schroeder | 414/723 |

FOREIGN PATENT DOCUMENTS 483121 4/1938 United Kingdom ................ 414/393

Primary Examiner—Robert J. Spar
Assistant Examiner—Donald W. Underwood
Attorney, Agent, or Firm—B. E. Deutsch

[57] ABSTRACT

A pivot pin assembly for a bucket loader wherein a pivot pin having an enlarged tapered head passes through bushings in the loader boom arm to a distal end whereat an externally tapered thrust collar is slideably mounted thereon. An adjustment plug is threaded in the thrust collar and regulates the spacing between the collar and the pin end thereby setting the side clearance for the bushings. A pair of split wedge collars respectively lock the tapered pin head and the thrust collar in the bushing bracket apertures, the split collars being wedgingly locked by end plates bolted to the respective ends of the pin. Lip seals are provided between the boom arm and the pin head and the thrust collar and the boom arm and the pin is provided with an internal lubricant reservoir communicating with the boom arm bushings which may be easily refilled as necessary.

7 Claims, 1 Drawing Figure

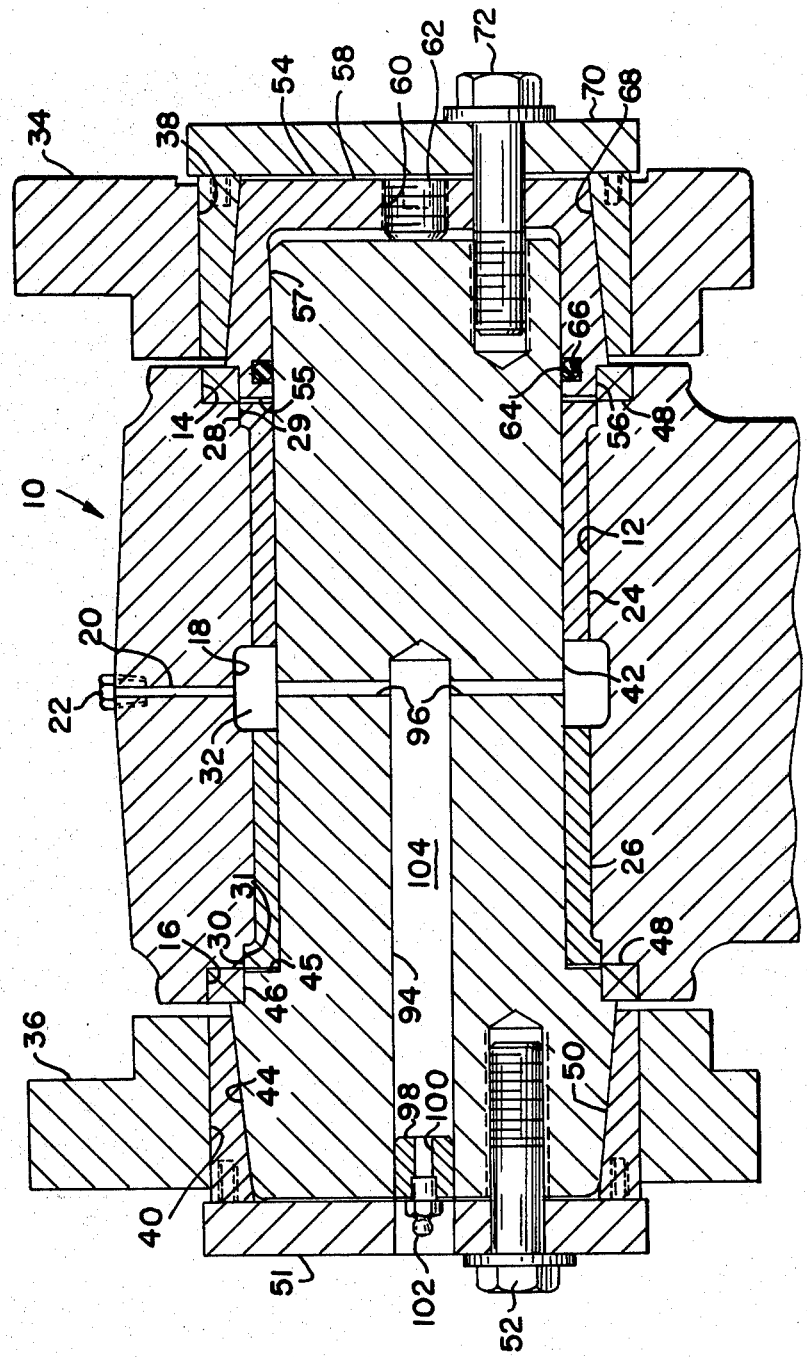

PIVOT PIN ASSEMBLY

BACKGROUND OF THE INVENTION AND THE PRIOR ART

This invention relates to pivot pins of the type used for mounting a bucket on a boom arm of a tractor loader and, more particularly, to a pivot pin assembly which can be installed without the use of shims while maintaining proper clearances thereby facilitating assembly and disassembly of the pivot joint.

Pivot pin assemblies which are utilized for pivotal attachment of a bucket to the boom arm of a loader are exposed to a very hostile environment due to the abrasive nature of materials being handled by the bucket and the close proximity of such assemblies to those materials. In addition, such pivot pin assemblies are subjected to severe loading as a result of manipulation of the bucket and the loader vehicle in order to fill the bucket with the material being handled and to then extricate the material from the bucket. This often requires the intentional imposition of shock loads in order to vibrate the bucket and dislodge any material adhering to it. Because of this, the sealing and lubrication requirements of such pin assemblies as well as maintaining the proper clearances between the parts become quite important. At the same time because these pin joints will have relatively high mortality compared to other portions of the loader, it is necessary to facilitate servicing of this joint.

In U.S. Pat. No. 4,251,182, I have disclosed a serviceable pivot pin assembly having a headed pin slideably fit in one bracket aperture, a thrust collar slideable on the other end of the pin, and a bolted-on end plate for locking the pin, thrust collar, and bucket bracket as a unit. However, to maintain proper side clearance for the bushings in the boom arm, it was necessary to install shims between the end plate and the pin. Although it did provide the benefit of complete and easy serviceability, there were too many loose parts involved.

In previous pin assemblies, such as shown in U.S. Pat. No. 3,997,274, wedging collets were employed. However, such collets make it very difficult to control the side clearance of the boom arm bushings unless the collars are welded to the pin. If the end collars are welded to the pin, as also shown in U.S. Pat. No. 4,096,957, the pin boom arm bushings and collars cannot be serviced separately.

SUMMARY OF THE INVENTION

Accordingly, it is a primary object of the invention described and claimed herein to provide a pivot pin assembly in which the seals, pin, collars and bushings may be individually serviced while keeping the number of parts required to a minimum.

A further object of the invention is to provide said pivot pin with a means of adjusting and maintaining bushing side clearance during installation of the pin assembly.

The above and other objects of the invention are specifically met in a pivot pin assembly for a bucket loader wherein a pivot pin having an enlarged tapered head passes through bushings in the loader boom arm to a distal end whereat an externally tapered thrust collar is slideably mounted thereon. An adjustment plug is threaded in the thrust collar and regulates the spacing between the collar and the pin end thereby setting the side clearance for the bushings. A pair of split wedge collars respectively lock the tapered pin head and the thrust collar in the bushing bracket apertures, the split collars being wedgingly locked by end plates bolted to the respective ends of the pin. Lip seals are provided between the boom arm and the pin head and the thrust collar and the boom arm and the pin is provided with an internal lubricant reservoir communicating with the boom arm bushings which may be easily refilled as necessary.

DESCRIPTION OF THE DRAWINGS

Other objects of the invention will become more apparent upon a perusal of the following description of the preferred embodiment and the drawing which is a cross-section of a pivot pin assembly according to the present invention.

DESCRIPTION OF THE PREFERRED EMBODIMENT

Referring to the drawing, the free end of a loader boom arm, shown in cross section at 10 is provided with a transverse bore 12 which is counterbored at each end to form annular recesses 14 and 16. The transverse bore 12 intersects an interior groove 18 in the boom arm as does a cross-bore 20. A tapped portion at the outer end of cross-bore 20 permits the insertion of threaded plug 22 to seal the cross-bore. A pair of sleeve bearings 24 and 26 having an integrally formed, outwardly projecting thrust flange 28 and 30 respectively are pressed into the transverse bore 12, so that each bearing is nonrotatably retained relative to the boom arm 10, with the thrust flanges 28 and 30 being received within a second counterbore 29, 31 so that the thrust surfaces are flush with the bottom of the recesses 14 and 16 respectively. So positioned, the inner end of the bushings form with the groove 18 a reservoir chamber 32.

The bucket has a pair of brackets 34 and 36 parallelly affixed to and positioned on the bucket to span the loader boom arm. The brackets 34 and 36 are provided with axially aligned apertures 38 and 40 respectively. A pivot pin 42 having an enlarged tapered head 44 which functions as a seal retainer and axial trust ring, is inserted through the bore 40 in the bracket 36, through the bearings 26 and 24 in the boom arm 10 and into the bore 38 in the bracket 34. The enlarged head 44, which is shown integrally formed on the pin 42 but which may also be a separate member secured on the pin by welding, is machined to provide a radial thrust face 45 as well as an annular recess 46. The radial thrust face 45 abuts the thrust flange 30 of the bearing 26. A seal 48 which is pressed into the annular recess 16 of the boom arm 10 has its other portion operating against the annular recess 46 of the pin head 44. A split wedge collar 50 having an internal taper complementary to that of the enlarged pin head 44 is received in the boom arm aperture 40 and locks the pin head 44 in the aperture, being seated therein by an end plate 51 drawn axially toward the end of the pin 42 as by a plurality of bolts 52, one of which is shown, engaging tapped holes on the end of the pin.

The distal end of the pin 42 receives an externally tapered seal retainer and thrust collar 54 having a bore 57 which slideably receives the pin 42. The thrust collar 54 is machined similarly to the enlarged head 44 of the pin to provide a radial thrust flange 55 abutting the bearing flange 28 and an annular recess 56 which receives a seal 48 pressed into the counterbore 14 of the boom arm 10. The thrust collar 54 is further provided with a radial web portion 58 forming a cup-like shape the web portion 58 having a threaded hole 60 therethrough in which a plug 62 is threaded. An O-ring seal 64 is provided in a groove 66 in the thrust collar to prevent leakage of lubricant between the thrust collar and pin 42. A split wedge collar 68, having an internal taper complementary to the external taper of the thrust collar 54, is disposed within the aperture 38 of the bucket bracket 34 in locking engagement with the thrust collar 54. An end plate 70 is drawn axially toward the end of the pin 42 as by a plurality of bolts 72, one of which is shown, to seat the collar 68 and thus lock the thrust ring 54 relative to the bucket bracket 34.

During the installation of the pivot pin 42 in the boom arm and bucket, the pin is inserted through the bracket 36, boom arm 10, and bracket 34 and the head 44 of the pin 42 is locked in the bucket bracket 36 by the split wedge collar 50. This fixes the location of the right end of the pin 42. The thrust ring 54 is slid onto the pin 42 and the adjustment plug 62 is adjusted to fix the proper amount of side clearance between the thrust face 28 of the sleeve bushing 24 and the thrust face 55 of the thrust collar 54. Since the position of the thrust collar is now solidly fixed through the plug 62 and the pin 42, when the split wedge collar 68 is drawn into the aperture 38 to lock the position of the thrust collar 54, the thrust collar cannot move inwardly on the sleeve bearing and reduce the side clearance. Once the thrust collar 54 is locked by the split collar 68, the adjustment plug 62 is of no use until a future reassembly, but will do no harm if it backs out in its bore 60 since it is retained by end plate 70.

The pin 42 is further provided with an axial bore 94 which communicates with a cross-bore 96, the cross-bore 96 being located to communicate with the reservoir chamber 32. A plug 98 is pressed into the bore 96 and serves to seal the open end thereof. A central opening 100 is then provided in the plug 98 to accommodate the lubricant fitting 102. The end plate 51 is provided with a hole in the center which also serves to recess the lubricant fitting 102 and protect it from damage. Thus a second larger reservoir 104 is provided within the pin. It will be appreciated that, upon removal of the plug 22, the lubricant inserted through the fitting 102 will force air inside the reservoir and chamber 32 to be expelled from the cross-bore 20 and the appearance of lubricant there will provide assurance that the reservoir and chamber are filled with lubricant.

What is claimed is:

1. A pivot pin assembly for pivotal mounting of a bucket on a boom arm, said bucket having a pair of apertured brackets secured thereto and said boom arm having a transverse bore, said assembly comprising:
   bearings retained in said transverse bore;
   a pivot pin having an enlarged tapered head extending within the aperture of one of said brackets, a body rotatably mounted in said bearings, and a distal end associated with the aperture of the other of said brackets;
   a cup-like thrust collar disposed on the distal end of said pin, said thrust collar having an externally tapered wall and a radial wall enclosing one end of the thrust collar;
   a pair of internally tapered split wedge collars disposed in said bracket apertures and respectively engaging said pin head and said thrust collar;
   a pair of end plates disposed respectively outwardly adjacent said tapered split wedge collars;
   means interconnecting the pin and said end plates to draw said split wedge collars into locked engagement respectively with said pin head and said thrust collar within said apertures; and
   adjustable means associated with said thrust collar for selectively fixing the spacing between said radial wall of said thrust collar and the distal end of said pin.

2. The invention in accordance with claim 1 and said adjustable means comprising a plug threadingly engaged with said thrust collar radial wall and extending inwardly of the thrust collar to engage said pin end.

3. The invention in accordance with claim 2 and said bearings comprising a pair of sleeve bushings, each having a radially extending thrust flange retained in said transverse bore respectively adjacent said pin head and said thrust collar.

4. The invention in accordance with claim 3 and a pair of lip seals positioned respectively between the pin head and boom arm and the thrust collar and boom arm.

5. The invention in accordance with claim 1 or claim 4 and said pin having an internal lubricant reservoir and means for communicating the lubricant to said bearings.

6. A pivot pin assembly for pivotal mounting of a bucket on a boom arm, said bucket having a pair of apertured brackets secured thereto and said boom arm having a transverse bore, said pivot pin assembly comprising:
   bearings retained in said transverse bore;
   a pivot pin having one end fixed within the aperture of one of said brackets, a body rotatably mounted in said bearing, and a distal end associated with the aperture of the other of said brackets;
   a cup-like thrust collar disposed on said distal end of said pin, said thrust collar having an externally tapered cylindrical wall and a radial wall spanning one end of the thrust collar;
   an internally tapered split wedge collar disposed in the aperture of the other of said brackets and engaging said thrust collar;
   an end plate disposed outwardly adjacent said tapered split wedge collar;
   means interconnecting the pin and said end plate to draw said split wedge collar into locked engagement with said thrust collar within said other aperture; and
   clearance fixing means interacting between said thrust collar and said pin for selectively fixing the clearance between said radial wall of said thrust collar and said distal end of said pin.

7. The invention in accordance with claim 6 and said clearance fixing means threadingly engaging screw threads disposed on said thrust collar.

* * * * *